(12) United States Patent
Mollov et al.

(10) Patent No.: US 9,152,499 B1
(45) Date of Patent: *Oct. 6, 2015

(54) METHOD AND SYSTEM FOR CALCULATING PARITY VALUES FOR MULTI-DIMENSIONAL RAID

(71) Applicant: DSSD, Inc., Menlo Park, CA (US)

(72) Inventors: Todor Ivanov Mollov, Mountain View, CA (US); Jeffrey S. Bonwick, Santa Clara, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,795

(22) Filed: Oct. 9, 2014

Related U.S. Application Data

(63) Continuation of application No. 14/096,708, filed on Dec. 4, 2013.

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/0619* (2013.01); *G06F 3/0647* (2013.01); *G06F 3/0689* (2013.01)

(58) Field of Classification Search
CPC ............... G06F 11/1076; G06F 2211/1057; G06F 2211/1028; G06F 3/0689; G06F 2211/1059
USPC ....................................... 714/6.24
See application file for complete search history.

(56) References Cited

U.S. PATENT DOCUMENTS

| 6,351,838 | B1 | 2/2002 | Amelia |
| 7,143,227 | B2 | 11/2006 | Maine |
| 7,389,396 | B1 | 6/2008 | Goel et al. |
| 7,398,418 | B2 | 7/2008 | Soran et al. |
| 7,406,621 | B2 | 7/2008 | Lubbers et al. |

(Continued)

FOREIGN PATENT DOCUMENTS

| EP | 1577774 A2 | 9/2005 |
| WO | 2010/071655 A1 | 6/2010 |

OTHER PUBLICATIONS

Anvin, H., "The mathematics of RAID-6", retrieved from the internet at http://www.cs.utk.edu/"plank/plank/papers/CS-96-332.html, Jan. 20, 2004 (9 pages).

(Continued)

*Primary Examiner* — Bryce Bonzo
*Assistant Examiner* — Elmira Mehrmanesh
(74) *Attorney, Agent, or Firm* — Osha Liang LLP

(57) ABSTRACT

A method for calculating parity values including calculating a first set of parity values using datum stored in RAID Grid locations in a first PCB, where datum associated with the RAID Grid locations in the first PCB is obtained in a first order that is based on a Hilbert curve. The method further includes calculating a second set of parity values using datum stored in RAID Grid locations in a second PCB, where datum associated with the RAID Grid locations in the second PCB is obtained in a second order that is based on the Hilbert curve. The method further includes storing at least a portion of the first set of parity values and a second set of parity values in a cache, memory, or persistent storage, where each of the first parity values and second parity values is associated with a separate RAID Grid location in the RAID Grid.

20 Claims, 14 Drawing Sheets

(56) References Cited

U.S. PATENT DOCUMENTS

| | | |
|---|---|---|
| 7,536,508 B2 | 5/2009 | Davies |
| 7,543,100 B2 | 6/2009 | Singhal et al. |
| 7,594,075 B2 | 9/2009 | Roberson et al. |
| 7,752,389 B1 | 7/2010 | Fan |
| 7,934,120 B2 | 4/2011 | Zohar et al. |
| 8,078,906 B2 | 12/2011 | Yochai et al. |
| 8,145,840 B2 | 3/2012 | Koul et al. |
| 8,200,887 B2 | 6/2012 | Bennett |
| 8,316,260 B1 | 11/2012 | Bonwick |
| 8,327,185 B1 | 12/2012 | Bonwick |
| 8,341,342 B1 | 12/2012 | Bonwick et al. |
| 8,464,095 B1 | 6/2013 | Bonwick |
| 8,484,506 B2 | 7/2013 | Kumar et al. |
| 2002/0161972 A1 | 10/2002 | Talagala et al. |
| 2003/0004938 A1 | 1/2003 | Lawder |
| 2004/0153961 A1 | 8/2004 | Park et al. |
| 2005/0166083 A1 | 7/2005 | Frey et al. |
| 2005/0223156 A1 | 10/2005 | Lubbers et al. |
| 2006/0085594 A1 | 4/2006 | Roberson et al. |
| 2007/0220309 A1 | 9/2007 | Andre et al. |
| 2008/0109602 A1 | 5/2008 | Ananthamurthy et al. |
| 2008/0168225 A1 | 7/2008 | O'Connor |
| 2009/0187786 A1 | 7/2009 | Jones et al. |
| 2010/0199125 A1 | 8/2010 | Reche |
| 2012/0072768 A1 | 3/2012 | Morris et al. |
| 2012/0079318 A1 | 3/2012 | Colgrove et al. |
| 2012/0089778 A1 | 4/2012 | Au et al. |
| 2012/0166712 A1 | 6/2012 | Lary |

OTHER PUBLICATIONS

Kazmi, A., "PCI Express™ Basics & Applications in Communication Systems," PCI-SIG Developers Conference, 2004 (50 pages).
Percival, D., "Multicast Over PCT Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (1 pages).
International Search Report issued in PCT/US2013/033224 mailed Jul. 31, 2013 (5 pages).
Written Opinion issued in PCT/US2013/033224 mailed Jul. 31, 2013 (10 pages).
International Search Report issued in PCT/US076073 mailed Apr. 2, 2014 (3 pages).
Written Opinion issued in PCT/US2013/076073 mailed Apr. 2, 2014 (9 pages).

US 9,152,499 B1

METHOD AND SYSTEM FOR CALCULATING PARITY VALUES FOR MULTI-DIMENSIONAL RAID

CROSS-REFERENCE TO RELATED APPLICATIONS

The instant application is a continuation of U.S. patent application Ser. No. 14/096,708 and claims benefit under 35 U.S.C. §120 to U.S. patent application Ser. No. 14/096,708. U.S. patent application Ser. No. 14/096,708 is hereby incorporated by reference in its entirety.

BACKGROUND

In order to protect against potential loss of data in a storage system, it is often advantageous to implement a replication scheme. Current replication schemes are only able to sustain a limited amount of error before data within the storage system is unable to be read.

SUMMARY

In general, embodiments of the invention relate to a method for calculating parity values. The method includes performing, using a first datum, a first plurality of parity value calculations to obtain a first plurality of parity values, wherein the first datum is associated with a first RAID Grid location in a first parity calculation block (PCB) in a RAID Grid. The method further includes performing, using a second datum, a second plurality of parity value calculations to obtain a second plurality of parity values, wherein the second datum is associated with a second RAID Grid location in the first PCB. The method further includes performing, using a third datum and at least one selected from a group consisting of at least one of the first plurality of parity values and at least one of the second plurality of parity values, a third plurality of parity value calculations to obtain a third plurality of parity values, wherein the third datum is associated with a third RAID Grid location in the first PCB. The method further includes performing, using a fourth datum and at least one selected from a group consisting of at least one of the first plurality of parity values and at least one of the second plurality of parity values, a fourth plurality of parity value calculations to obtain a fourth plurality of parity values, wherein the fourth datum is associated with a fourth RAID Grid location in the first PCB, and storing each of the fourth plurality of parity values in at least one selected from a group consisting of cache, memory, and persistent storage, wherein each of the fourth plurality of parity values is associated with a separate RAID Grid location in the RAID Grid In general, embodiments of the invention relate to a method for calculating parity values. The method includes calculating a first set of parity values for a RAID Grid using datum stored in each of a plurality of RAID Grid locations in a first parity calculation block (PCB), wherein datum associated with each of the plurality of RAID Grid locations in the first PCB is obtained in a first order and wherein the first order is based on a Hilbert curve, calculating a second set of parity values for the RAID Grid using datum stored in each of a plurality of RAID Grid locations in a second PCB, wherein datum associated with each of the plurality of RAID Grid locations in the second PCB is obtained in a second order and wherein the second order is based on the Hilbert curve, and storing at least a portion of the first set of parity values and a second set of parity values in at least one selected from a group consisting of cache, memory, and persistent storage, wherein each of the first plurality of parity values and second plurality of parity values is associated with a separate RAID Grid location in the RAID Grid.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7F, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for calculating parity values when using a multi-dimensional RAID scheme. More specifically, embodiments of the invention provide a method and system for calculating parity values in a 2D RAID scheme and a 3D RAID scheme. In one or more embodiments of the invention, when the cache is not large enough to store all parity values in the RAID Grid, the parity values are calculated by traversing RAID Grid locations in an order that minimizes (or at least decreases) the number of cache misses that would otherwise occur.

Figure 4:
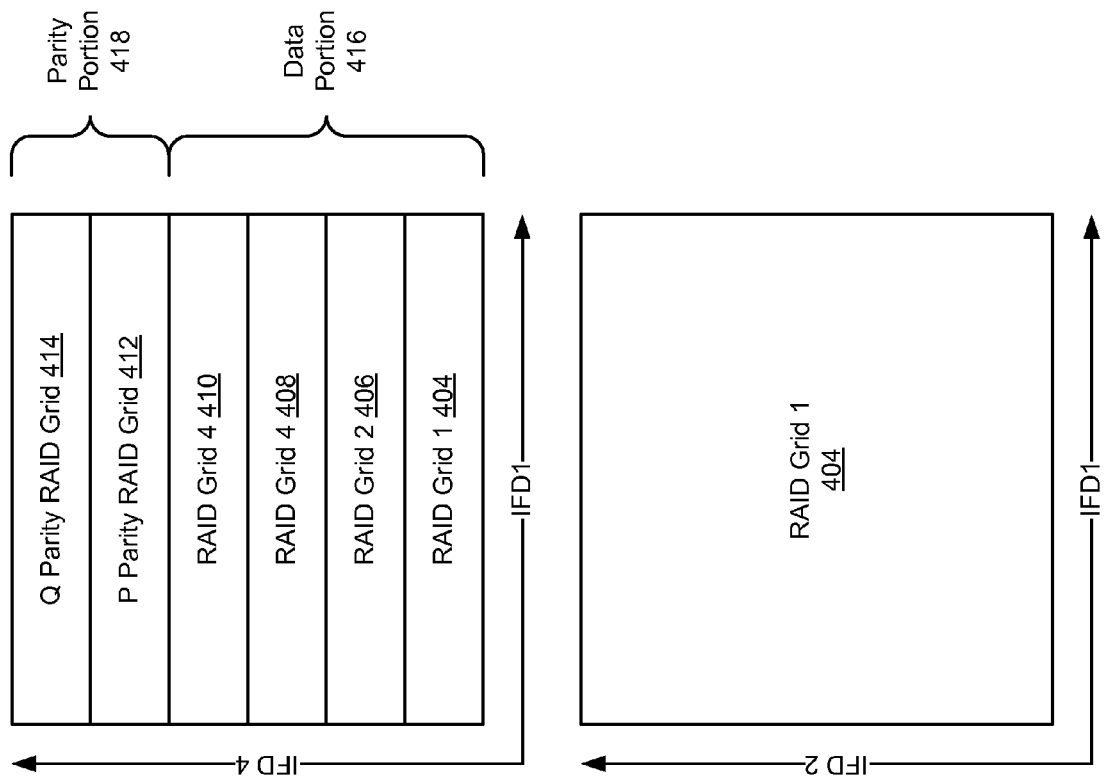
FIG. 4 shows a RAID cube and various views of the RAID cube in accordance with one embodiment of the invention.
Figure 4:
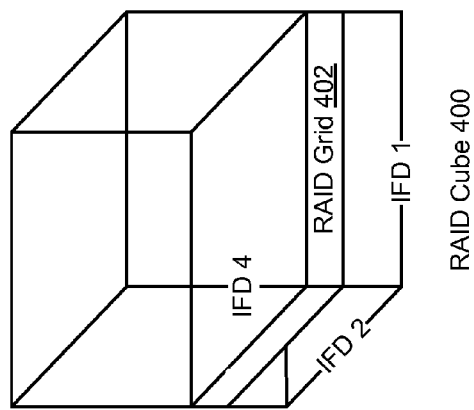
Figure 5:
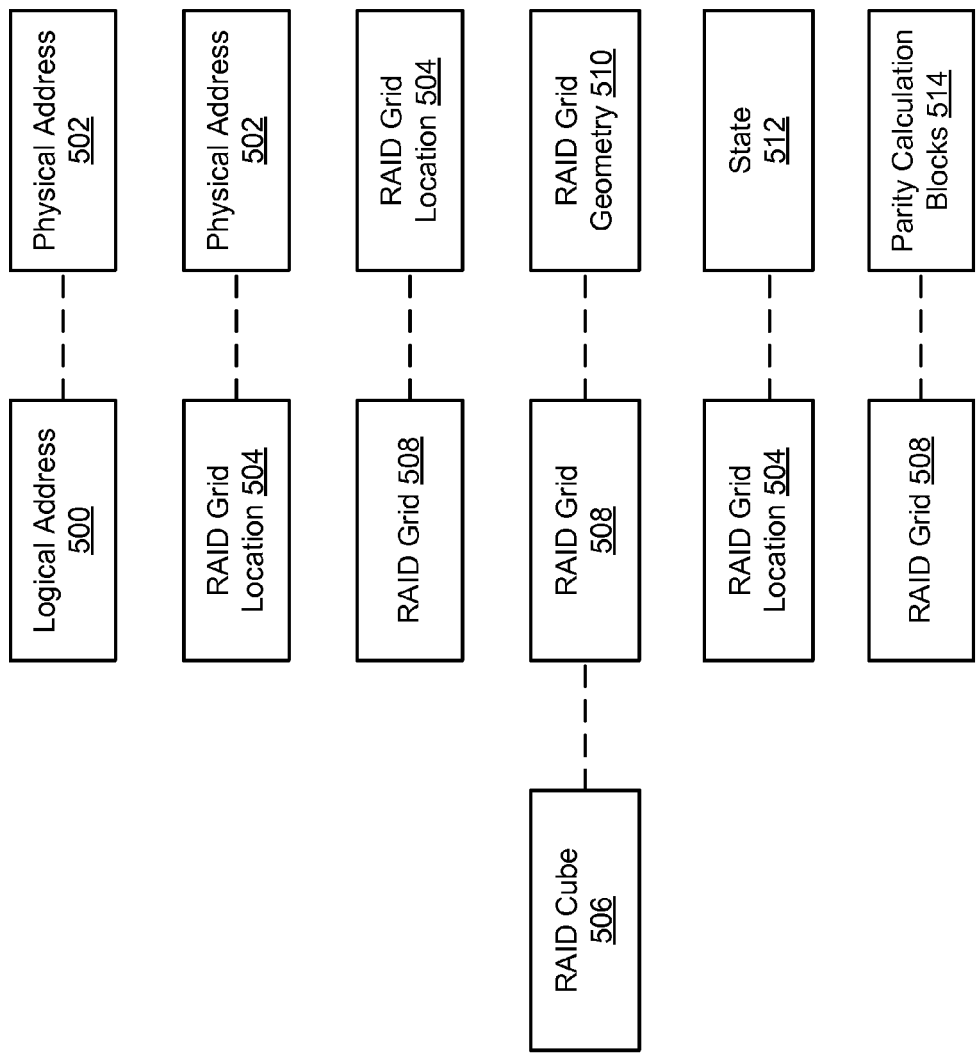
FIG. 5 shows data structures in accordance with one embodiment of the invention.

For purposes of this invention, the term "RAID" as used herein refers to "Redundant Array of Independent Disks." While "RAID" refers to any array of independent disks, embodiments of the invention may be implemented using any type of persistent storage device where the RAID Grid locations (see e.g., FIG. 2) may be distributed across one or more persistent storage devices based on the implementation of the invention (see e.g., FIGS. 4 and 5).

Figure 1:
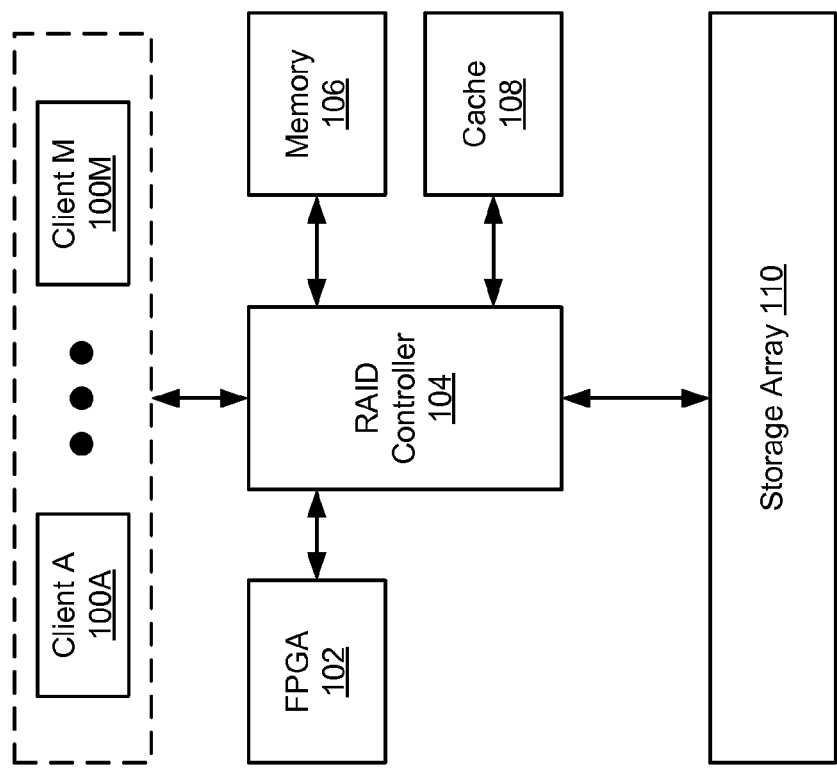
FIG. 1 shows a system in accordance with one embodiment of the invention.

FIG. 1 shows a system in accordance with one embodiment of the invention. As shown in FIG. 1, the system includes one or more clients (100A, 100M), a RAID controller (104), memory (106), optionally an FPGA (102), cache (108), and a storage array (110).

In one embodiment of the invention, a client (100A, 100M) is any system or process executing on a system that includes functionality to issue a read request or a write request to the RAID controller (104). In one embodiment of the invention, the clients (100A, 100M) may each include a processor (not shown), memory (not shown), and persistent storage (not shown). In one embodiment of the invention, the RAID controller (104) is configured to implement the multi-dimensional RAID scheme, which includes writing data to the storage array, cache, and/or memory in a manner consistent with the multi-dimensional RAID scheme (see e.g., FIG. 6A-6B) and reading data (including reconstructing data) from the storage array, cache, and/or memory in a manner consistent with the multi-dimensional RAID scheme (as described in U.S. Pat. No. 8,316,260, which is hereby incorporated by reference in its entirety). In one embodiment of the invention, the RAID controller (104) includes a processor configured to execute instructions to implement one or more embodiments of the invention, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity values) prior to such data being stored in the storage array.

In one embodiment of the invention, cache (108) is volatile memory that is configured to temporarily store various data (including parity values). The cache (108) is configured to store less data (including parity values) than the memory (106); however, the cache (108) has a lower read and write latency than the memory (106). In one embodiment of the invention, the cache (108) is a multi-level cache. While FIG. 1 shows the cache as separate from the RAID controller (104), the cache (108) may be an on-chip cache located the same chip as the processor (not shown). In one embodiment of the invention, the cache (108) may not concurrently store the entire RAID Grid or all parity values (or intermediate parity values) for the RAID Grid (see e.g., FIG. 2, 204-212); rather, in such embodiments, the cache (108) may only concurrently store a subset of the values (including data values, intermediate parity values, and parity values) in the RAID Grid (see e.g., FIGS. 7A-7F).

In one embodiment of the invention, the FPGA (102) (if present) includes functionality to calculate P and/or Q parity information for purposes of storing data in the memory (106), cache (108), and/or storage array (110) and/or functionality to perform various calculations necessary to recover corrupted data stored using the multi-dimensional RAID scheme. The RAID controller (104) may use the FPGA (102) to offload the processing of various data in accordance with one or more embodiments of the invention. In one embodiment of the invention, the storage array (110) includes a number of individual persistent storage devices including, but not limited to, magnetic memory devices, optical memory devices, solid state memory devices, phase change memory devices, any other suitable type of persistent memory device, or any combination thereof.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an ASIC(s), a graphics processing unit(s) (GPU), a general purpose processor(s), any other hardware device capable of calculating P and/or Q parity information for purposes of storing data in the storage array and/or performing various calculations necessary to recover corrupted data stored using the multi-dimensional RAID scheme, any device that includes a combination of hardware, firmware, and/or software configured to calculate P and/or Q parity information for purposes of storing data in the storage array (110) and/or to perform various calculations necessary to recover corrupted data stored using the multi-dimensional RAID scheme, or any combination thereof.

Figure 2:
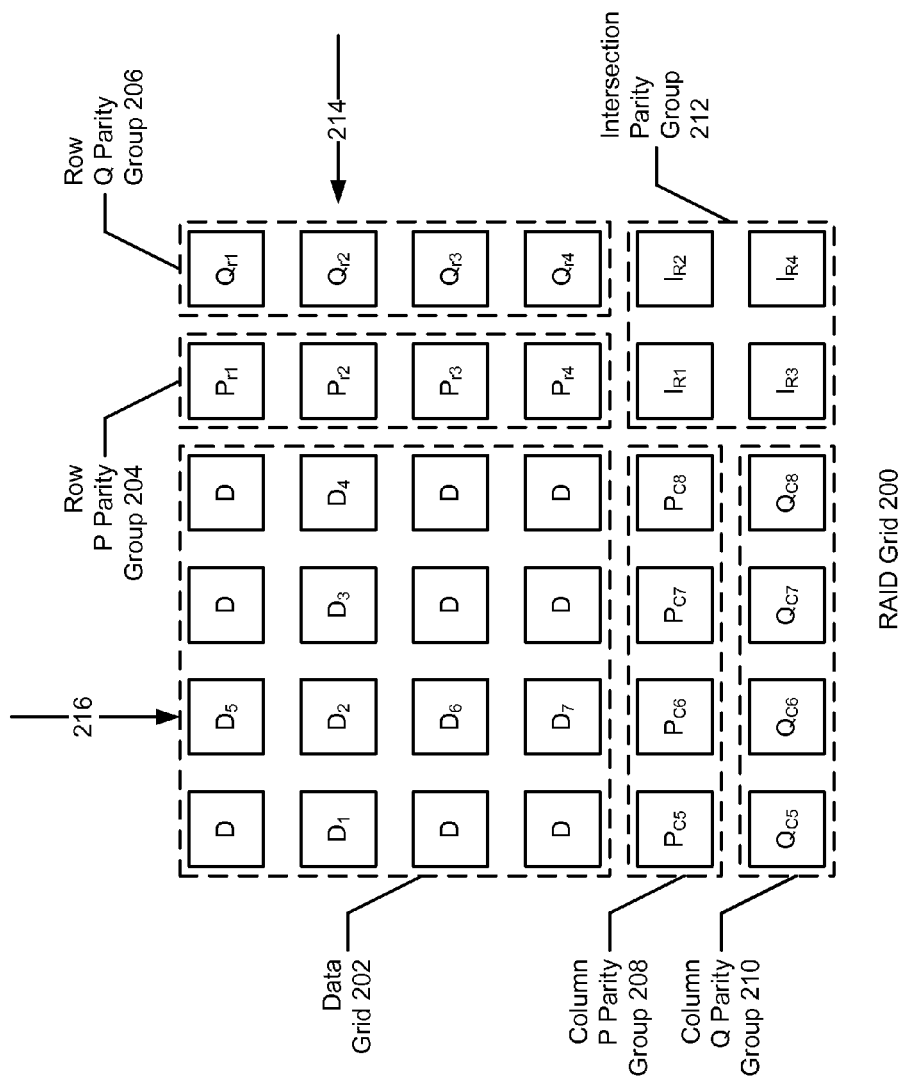
FIG. 2 shows a RAID Grid in accordance with one embodiment of the invention.

FIG. 2 shows a RAID Grid in accordance with one embodiment of the invention. In one embodiment of the invention, if the RAID controller implements a 2D RAID scheme or a 3D RAID scheme (see FIG. 4), the RAID controller stores data in a RAID Grid (200). FIG. 2 shows the conceptual portions of a RAID Grid in accordance with one or more embodiments of the invention. The RAID Grid (200) includes a number of RAID Grid locations, where each RAID Grid location is ultimately written to a unique physical address in the storage array. The RAID Grid (200) includes (i) a data grid (202), which includes RAID Grid locations that store data received from the client (i.e., data that the client has instructed the RAID controller to write to the storage array; (ii) a row P parity group (204), which includes the RAID Grid locations that store P parity values calculated using data in RAID Grid locations in a row (described below); (iii) a row Q parity group (206), which includes the RAID Grid locations that store Q parity values calculated using data in RAID Grid locations in a row (described below); (iv) a column P parity group (208), which includes the RAID Grid locations that store P parity values calculated using data in RAID Grid locations in a column (described below); (v) a column Q parity group (210), which includes the RAID Grid locations that store the Q parity values calculated using data in RAID Grid locations in a column (described below); and (vi) an intersection parity group (212), which includes parity values calculated using (a) data from RAID Grid locations in row P parity group (204), (b) data from RAID Grid locations in row Q parity group (206), (c) data from RAID Grid locations in column P parity group (208), and/or (d) data from RAID Grid locations in column Q parity group (210) (described below).

Referring to row (214), in one embodiment of the invention, the data stored in RAID Grid locations denoted as $P_{r2}$ in row (214) is calculated by applying a P parity function to all RAID Grid locations in the row (214) that includes data (e.g., $P_{r2}=f_P(D_1, D_2, D_3, D_4)$). Similarly, in one embodiment of the invention, the data stored in RAID Grid location denoted as $Q_{r2}$ in row (214) is calculated by applying a Q parity function to all RAID Grid locations in the row (214) that includes data (e.g., $Q_{r2}=f_Q(D_1, D_2, D_3, D_4)$).

Referring to column (216), in one embodiment of the invention, data stored in the RAID Grid location denoted as $P_{c6}$ in column (216) is calculated by applying a P parity function to all RAID Grid locations in the column (216) that includes data (e.g., $P_{C6}=f_P(D_5, D_2, D_6, D_7)$). Similarly, in one embodiment of the invention, data stored in the RAID Grid location denoted by $Q_{C6}$ in column (216) is calculated by applying a Q parity function to all RAID Grid locations in the column (216) that includes data (e.g., $Q_{C6}=f_Q(D_5, D_2, D_6, D_7)$.

Referring to the intersection parity group (212), in one embodiment of the invention, the data stored in the RAID Grid location denoted as $I_{r1}$ may be calculated by applying a P parity function to all RAID Grid locations in the row P Parity Group (204) or by applying a P parity function to all RAID Grid locations in the column P Parity Group (208). For example, $I_{r1}=f_P(P_{r1}, P_{r2}, P_{r3}, P_{r4})$ or $I_{r1}=f_P(P_{c5}, P_{c6}, P_{c7}, P_{c8})$.

In one embodiment of the invention, the data stored in the RAID Grid location denoted as $I_{r2}$ may be calculated by applying a P parity function to all RAID Grid locations in the row Q Parity Group (206) or by applying a Q parity function to all RAID Grid locations in the column P Parity Group (208). For example, $I_{r2}=f_P(Q_{r1}, Q_{r2}, Q_{r3}, Q_{r4})$ or $Ir2=f_Q(P_{c5}, P_{c6}, P_{c7}, P_{c8})$.

In one embodiment of the invention, the data stored in the RAID Grid location denoted as $I_{r3}$ may be calculated by applying a P parity function to all RAID Grid locations in the column Q Parity Group (210) or by applying a Q parity function to all RAID Grid locations in the row P Parity Group (204). For example, $I_{r3}=f_P(Q_{c5}, Q_{c6}, Q_{c7}, Q_{c8})$ or $Ir3=f_Q(P_{c1}, P_{c2}, P_{c3}, P_{c4})$.

In one embodiment of the invention, the data stored in the RAID Grid location denoted as $I_{r4}$ may be calculated by applying a Q parity function to all RAID Grid locations in the column Q Parity Group (210) or by applying a Q parity function to all RAID Grid locations in the row Q Parity Group (206). For example, $I_{r4}=f_Q(Q_{c1}, Q_{c2}, Q_{c3}, Q_{c4})$ or $I_{r4}=f_Q(Q_{c5}, Q_{c6}, Q_{c7}, Q_{c8})$.

In one embodiment of the invention, the P and Q parity functions used to calculate the values for all of parity groups may correspond to any P and Q parity functions used to implement RAID 6.

As discussed above, the RAID Grid (200) shown in FIG. 2 represents the conceptual layout of a RAID Grid. However, when the individual RAID Grid locations are written to the storage array, the relative location of the various RAID Grid locations may vary across a row and or a column. For example, referring to row (214), when the RAID Grid locations within row (214) are written to the storage array, the relative location of RAID Grid locations that include data (denoted by "D") and the RAID Grid locations that include parity values (i.e., the RAID Grid locations denoted as "$P_r$" and "$Q_r$") may be as follows: <$D_1, D_2, P_{r2}, D_3, Q_{r2}, D_4$>, <$P_{r2}, Q_{r2}, D_1, D_2, D_3, D_4$>, or any other arrangement within row (214). Similarly, referring to column (216), the relative location of RAID Grid locations that include data (denoted by "D") and the RAID Grid locations that include parity values (i.e., the RAID Grid locations denoted as "$P_c$" and "$Q_c$") may be as follows: <$D_5, D_2, D_6, P_{c6}, D_6, Q_{c6}$>, <$P_{c6}, D_5, D_2, Q_{c6}, D_6, D_7$>, or any other arrangement within column (216).

The RAID controller (or another entity in the system) may determine to which physical addresses in the storage array each of the RAID Grid locations is written. This determination may be made prior to receiving any of the data (denoted as "D") for a particular RAID Grid from the client. Alternatively, the determination may be made at some point prior to writing the RAID Grid locations to the storage array.

Those skilled in the art will appreciate that while FIG. 2 shows a RAID Grid that is 6×6, the RAID Grid may be implemented using any other dimensions without departing from the invention.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q=g^0 \cdot D_0 + D_0 + g^1 \cdot D_1 + g^2 \cdot D_{2+} \ldots + g^{n-1} \cdot D_{n-1}$, where Q corresponds any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID Grid in FIG. 2 includes P and Q parity for each row and column, embodiments of the invention may be implemented using greater or fewer parity values without departing from the invention. For example, each row and column may only include a P parity value. In another example, each row and column may include three parity values. The aforementioned examples are not intended to limit the invention. In one embodiment of the invention, regardless of the number of parity values used in the implementation of the invention, each of the parity values is a Reed-Solomon syndrome.

In one embodiment of the invention, the parity values stored in the RAID Grid locations associated with the Row P Parity Group (204), Row Q Parity Group (206), Column P Parity Group (208), and Column Q Parity Group (210) may each be calculated by loading all of the data values that contribute to the parity into the cache (108) and then performing the appropriate parity value calculation. For example, to calculate $P_{r2}$, the RAID controller may read $D_1$-$D_4$ into the cache (108). Once loaded, the RAID controller (104) may calculate $P_{r2}$ as follows: $P_{r2}=f_P(D_1, D_2, D_3, D_4)$.

However, if the cache does not have sufficient space to hold all of the data values, then an alternate approach to calculating $P_{r2}$ is required. Specifically, $P_{r2}$ may be calculated incrementally by loading only a subset of the various data values into the cache and calculating one or more intermediate parity values in order to ultimately obtain the parity value for $P_{r2}$. For example, consider the scenario in which the cache can only store three values at a time. Under these space constraints, $P_{r2}$ may be calculated as follows: (i) load $D_1$ and $D_2$ into the cache; (ii) calculate a first incremental parity value using $D_1$ and $D_2$; (iii) store first incremental parity value in cache; (iv) remove $D_1$ and $D_2$ from cache, and (v) load $D_3$ and $D_4$ into cache; and (vi) calculate $P_{r2}$ using $D_3$, $D_4$, and the incremental parity value. The above approach allows $P_{r2}$ to be calculated but results in at least four cache misses (i.e., cache misses resulting from loading $D_1$-$D_4$ into the cache). In one embodiment of the invention, parity calculation blocks (PCBs) may be used to reduce the number of cache misses (both for intermediate parity values and for data values) when calculating parity values in the RAID Grid.

Figure 3A:
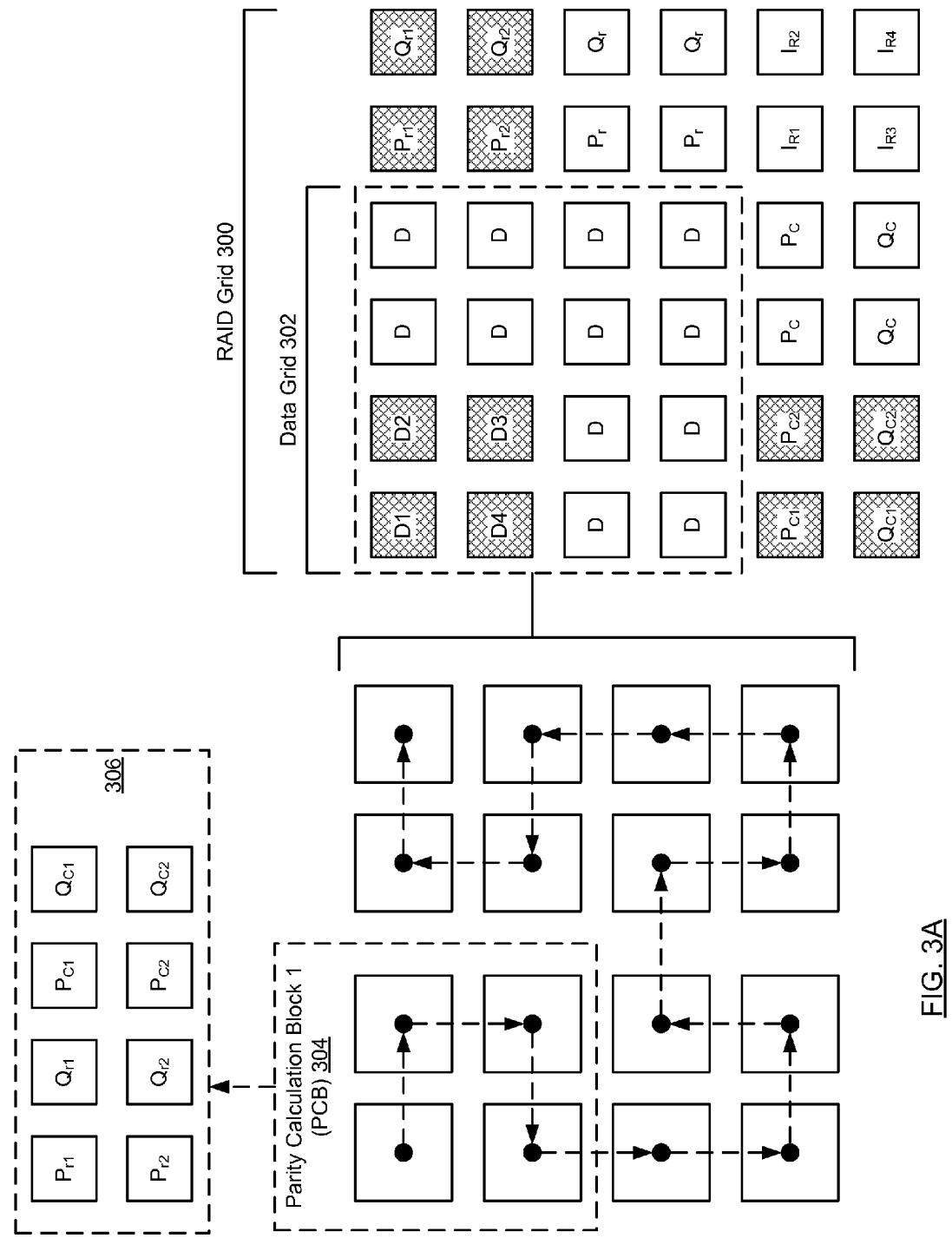
FIGS. 3A-3B show parity calculation blocks in accordance with one or more embodiments of the invention.

FIG. 3A shows parity calculation blocks (PCBs) in accordance with one or more embodiments of the invention. A PCB is a conceptual grouping of RAID Grid locations in RAID Grid (300). In one or more embodiments of the invention, the PCB includes a subset of RAID Grid locations in the Data Grid (302). In such cases, the Data Grid (302) may include multiple PCBs (see FIG. 3B). A given RAID Grid may include one or more PCBs. Further, not all RAID Grid Locations in the Data Grid (302) may be associated with a PCB. The size of all PCBs in the RAID Grid may be the same (see e.g., FIG. 3B) or may be different. Further, the size of PCBs may vary between different RAID Grids. The size of a PCB may be specified in terms of the number of RAID Grid locations in each dimension of the PCB. Accordingly, the size of the PCB may be specified as (i) an N×N PCB, where N≥2 or (ii) as an N×M PCB, where N≥2, M≥2, and N≠M.

In one or more embodiments of the invention, the size of the PCB may be limited by the size of the cache. Specifically, if the RAID Grid implements a RAID scheme that only includes P parity, then the minimum cache size of a PCB that is N×N is 2N+1, where the cache must include sufficient space to store 2N parity values (or intermediate parity values) and one data value (i.e., data that is stored in a RAID Grid location within the Data Grid (302)). In another example, if the RAID Grid implements a RAID scheme that includes P and Q parity, then the minimum cache size of a PCB that is N×N is 4N+1, where the cache must include sufficient space to store 4N parity values (or intermediate parity values) and one data value (i.e., data that is stored in a RAID Grid location within the Data Grid (302)).

Continuing with the discussion of FIG. 3A, as discussed above, each RAID Grid location in the Data Grid (202) contributes to multiple parity values, i.e., at least one parity value in each dimension. Accordingly, each PCB (which at a minimum includes four RAID Grid locations in the Data Grid) is associated with at least two parity values in each dimension (where the parity values may be associated with different rows and/or columns of the dimension). In order to minimize cache misses, the RAID controller defines an order in which each of the RAID Grid locations in the PCB is traversed, where the traversal path includes all RAID Grid locations in the PCB. At each step in the traversal path, multiple parity value calculations are performed. These parity value calculations include, at a minimum, one parity calculation along each dimension in the RAID Grid.

Referring to FIG. 3A, the RAID Grid (300) implements RAID 6 and, accordingly, includes P parity values and Q parity values in each dimension. Further, the PCB (304) in FIG. 3A is a 2×2 PCB. Accordingly, the data values (D1-D4) associated with the RAID Grid locations in the PCB (304) contribute to eight parity values (308): $P_{r1}, Q_{r1}, P_{c1}, Q_{c1}, P_{r2}, Q_{r2}, P_{c2}, Q_{c2}$. Specifically, each data value (D1-D4) is associated with four parity values as follows: (i) D1 is used to calculate parity values $P_{r1}, Q_{r1}, P_{c1}, Q_{c1}$; (ii) D2 is used to calculate parity values $P_{r1}, Q_{r1}, P_{c2}, Q_{c2}$; (iii) D3 is used to calculate parity values $P_{r2}, Q_{r2}, P_{c2}, Q_{c2}$; and (iv) D4 is used to calculate parity values $P_{r2}, Q_{r2}, P_{c1}, Q_{c1}$.

Continuing with the discussion of FIG. 3A, as discussed above, the RAID Grid locations in the PCB (304) are traversed in order to minimize the cache misses. In one embodiment of the invention, the traversal of the RAID Grid locations is such that an initial RAID Grid location in the PCB is selected and all subsequent RAID Grid locations are traversed as follows: (i) next RAID Grid location is adjacent to the current RAID Grid location and (ii) the next RAID Grid location has not been previously traversed. In one embodiment of the invention, a next RAID Grid location is adjacent to the current RAID Grid Location when the next RAID Grid location is either in the same row or same column as the current RAID Grid location. Referring to FIG. 3A, if the RAID Grid location with D1 is the initial RAID Grid location, then either the RAID Grid location with D2 or D4 is adjacent to the RAID Grid location with D1. Depending on the implementation of one or more embodiments of the invention, the RAID Grid location with D3 may also be deemed adjacent to the RAID Grid location with D1. In one embodiment of the invention, the RAID Grid locations in the PCB (304) are traversed in accordance with an order based on a Hilbert Curve. An example of such a traversal order is shown in FIG. 3A.

Referring to FIG. 3A, the traversal starts at D1 and then proceeds to D2, D3, and D4. The cache misses that occur using this traversal path are as follows: (i) five cache misses to obtain D1, $P_{r1}, Q_{r1}, P_{c1}$, and $Q_{c1}$; (ii) three cache misses to obtain D2, $P_{c2}$, and $Q_{c2}$; (iii) three cache misses to obtain D3, $P_{r2}$, and $Q_{r2}$; (iv) one cache miss to obtain D4. Based on the above traversal path, the parity value calculations for D4 do not require the loading of any additional parity values; rather, all the required parity values (which at this stage are intermediate parity values) are present in the cache. In one or more embodiments of the invention, the Data Grid (302) may be filled in the same order as the traversal path, as shown, e.g., in FIG. 3A. In such cases, there may be no cache misses for D1-D4 as D1-D4 will be present in the cache (though not necessarily at the same time) when they are required as input for the parity calculations.

Figure 3B:
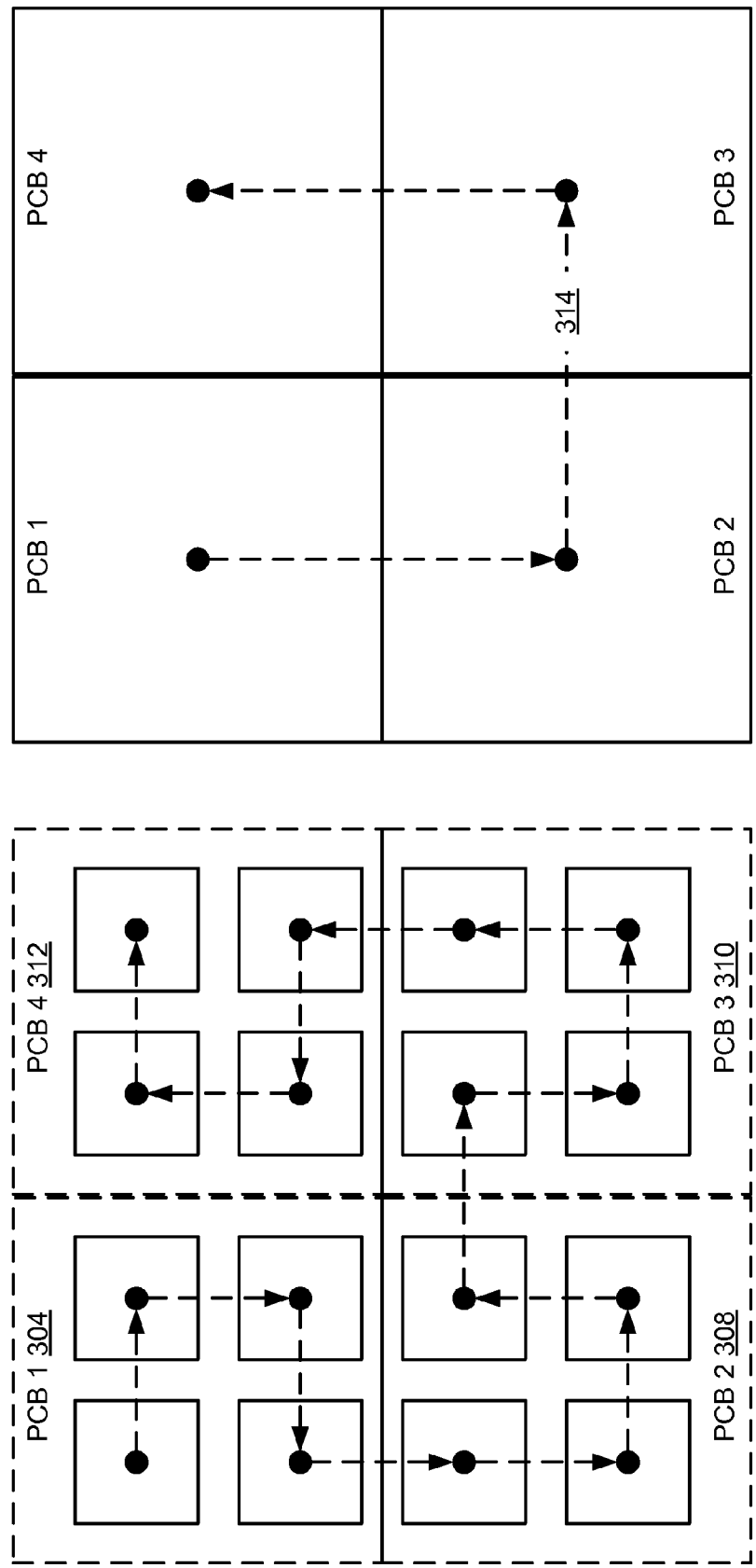

Referring to FIG. 3B, once all RAID Grid locations in a single PCB (304) have been traversed, a next PCB is selected to process. The next PCB is selected as follows: (i) next PCB is adjacent to the current PCB and (ii) the next PCB has not been previously traversed. In one embodiment of the invention, a next PCB is adjacent to the current PCB when the next PCB is either in the same row or same column as the current PCB. Referring to FIG. 3B, if PCB 1 (304) is the initial PCB, then either PCB 2 (308) or PCB 4 (312) is adjacent to PCB 1 (304). Depending on the implementation of one or more embodiments of the invention, PCB 3 (310) may also be deemed adjacent to PCB 1 (304). In one embodiment of the invention, the PCBs are traversed in accordance with an order based on a Hilbert Curve. An example of such a traversal order (314) is shown in FIG. 3B. The traversal order of the RAID Grid locations within a given PCB may not the same as the traversal order between various PCBs in the RAID Grid.

FIG. 4 shows a RAID cube and various views of the RAID cube in accordance with one embodiment of the invention. As shown in FIG. 4, a RAID cube (400) corresponds to a conceptual stack of RAID Grids (402). As discussed above, the RAID controller (or another entity in the system) selects the physical addresses within the storage array in which to store the data for each of the RAID Grid locations. In one embodiment of the invention, the selection of the physical addresses may be determined in accordance with the independent fault domains (IFDs) for which the RAID Grid (or RAID cube) is designed to protect against. Said another way, the physical addresses may be selected in a manner to protect against failures in one or more IFDs.

In one or more embodiments of the invention, an IFD corresponds to a failure mode which results in the data at a given location being inaccessible. Each IFD corresponds to an independent mode of failure in the storage array. For example, if the data is stored in NAND flash, where the NAND flash is part of a storage module (which includes multiple NAND dies), then the IFDs may be (i) storage module, (ii) channel (i.e., the channel used by the storage module controller (not shown) in the storage module to write data to the NAND flash), and (iii) NAND die.

Continuing with the discussion of FIG. 4, as shown in FIG. 4, each RAID Grid location (not shown) for a given RAID Grid (402, 404) is written to a physical address (or will be written to a physical address) in the storage array (not shown) that is selected using a unique pair of values from IFD 1 and IFD 2, but has the same value for IFD 4. For example, if the data in the storage array is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID Grid, the data in each RAID Grid location is written to a unique combination of storage module (IFD 1) and channel (IFD 2) but is written to the same NAND die (on each of the storage modules). Those skilled in the art will appreciate that the invention is not limited to the three independent fault domains described above. Further, those skilled in the art will appreciate that the invention is not limited to a storage array that includes NAND flash.

Continuing with FIG. 4, as discussed above, the RAID cube (400) is conceptual stack of RAID Grids. More specifically, in one embodiment of the invention, the RAID cube (400) may include (i) a data portion (416), which includes two or more RAID Grids (404, 406, 408, 410) (see FIG. 2) and a parity portion (418) that includes a P parity RAID Grid (412) and a Q parity RAID Grid (414).

In one embodiment of the invention, the RAID Grids (404, 406, 408, 410) in the data portion (416) include parity values (see FIG. 2), which allows data within the RAID Grid to be recovered using only data (including parity values) within the RAID Grid. In one embodiment of the invention, the RAID cube is arranged such that data for a given RAID Grid location in a given RAID Grid (404, 406, 408, 410) may be recovered using data (including parity values) from other RAID Grids (in both the data portion (416) and the parity portion (420). In one embodiment of the invention, the parity portion (418) of the RAID cube enables such a recovery mechanism.

In one embodiment of the invention, the P parity RAID Grid (412) is the same dimension as the underlying RAID Grids (404, 406, 408, 410), where the data in every RAID Grid location within the P Parity RAID Grid is calculated by applying a P parity function (e.g., an XOR function) to data (including parity values) from the RAID Grids in the data portion (416). Similarly, the Q parity RAID Grid (414) is the same dimension as the underlying RAID Grids (404, 406, 408, 410), where the data in every RAID Grid location within the Q Parity RAID Grid is calculated by applying a Q parity function to data (including parity values) from the RAID Grids in the data portion (416).

FIG. 5 shows data structures in accordance with one embodiment of the invention. In one embodiment of the invention, the RAID controller includes one or more data structures to implement the multi-dimensional RAID schemes.

In one embodiment of the invention, the RAID controller includes a data structure that tracks the mappings between data provided by the client and the physical address of such data in the storage array. In one embodiment of the invention, the RAID controller tracks the aforementioned information using a mapping between a logical address (500) e.g., <object, offset>, which identifies the data from the perspective of the client, and physical address (502), which identifies the location of the data within the storage array. In one embodiment of the invention, the mapping may be between a hash value derived from applying a hash function (e.g., MD5, SHA 1) to the logical address. Those skilled in the art will appreciate that any form of logical address may be used without departing the invention.

In one embodiment of the invention, the RAID controller includes a data structure that tracks how each RAID Grid location (504) (see FIG. 2) is mapped to a particular physical address (502) in the storage array.

In one embodiment of the invention, the RAID controller includes a data structure that tracks which RAID Grid (including RAID Grids in the data portion and the parity portion) (508) is associated with which RAID cube (506) (assuming that the RAID controller is implementing a 3D RAID scheme) and also which RAID Grid locations (504) are associated with each RAID Grid (508).

In one embodiment of the invention, the RAID controller includes a data structure that tracks the state (512) of each RAID Grid location (504). In one embodiment of the invention, the state (512) of a RAID Grid location may be set as filled (denoting that data (or a parity value) has been written to the RAID Grid location) or empty (denoting that no data (or any parity values) has been written to the RAID Grid location). In one embodiment of the invention, the RAID controller may also set the state of the RAID Grid location to filled once the RAID controller identifies data to write to the RAID Grid location.

In one embodiment of the invention, the RAID controller includes a data structure that tracks the RAID Grid geometry (510) for each RAID Grid (508). In one embodiment of the invention, the RAID Grid geometry may include, but is not limited to, the size of RAID Grid and the IFD associated with each dimension of the RAID Grid. This data structure (or another data structure) may also track the size of the RAID cube and the IFD associated with each dimension of the RAID cube.

In one embodiment of the invention, the RAID controller may also track the PCBs (514) that are associated with each RAID Grid (508). In addition, the RAID controller may also track the order of traversing the RAID Grid locations within each of the PCBs and the order of traversing the PCBs within the RAID Grid (see e.g., FIGS. 3A-3B).

In one embodiment of the invention, the RAID controller includes a data structure that tracks the location of each P and Q parity value (including parity values within the intersection parity group (see FIG. 2)) within each row and/or column within each RAID Grid.

In one embodiment of the invention, the RAID controller includes a data structure that tracks which RAID Grid locations in the data portion of the RAID cube are used to calculate each of the P and Q parity values in the P Parity RAID Grid and Q Parity RAID Grid, respectively.

Those skilled in the art will appreciate that the invention may be implemented such that one or more of the aforementioned data structures is combined. Further, the invention may be implemented by tracking more or less information about the RAID Grid without departing from the invention. Further, the invention may be implemented such as that at least a portion of the aforementioned data that is tracked by the aforementioned data structures is included within the individual RAID Grids. Such an embodiment is described in U.S. Pat. No. 8,464,095, which is hereby incorporated by reference in its entirety.

Figure 6A:
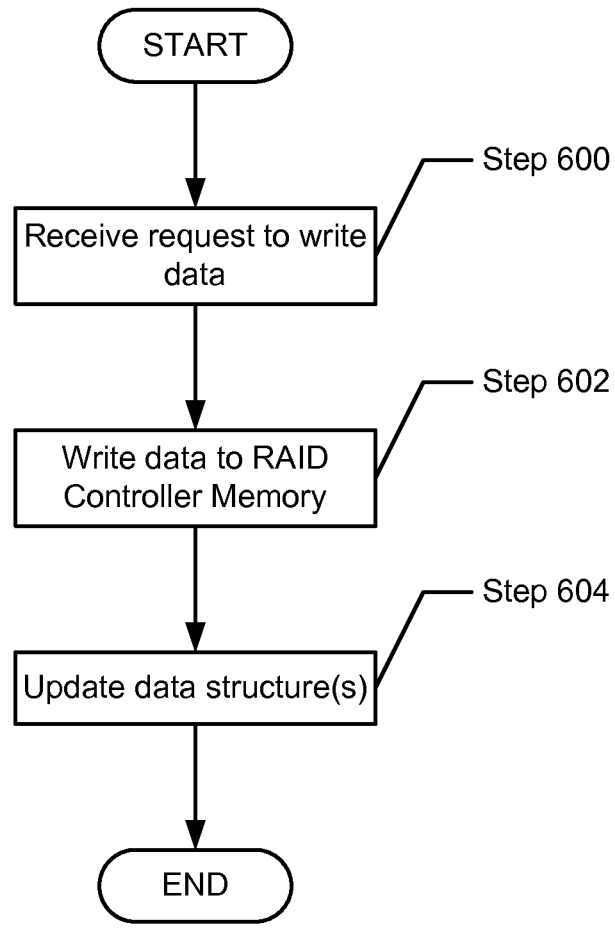
FIGS. 6A-6B show flow charts in accordance with one embodiment of the invention.
Figure 6B:
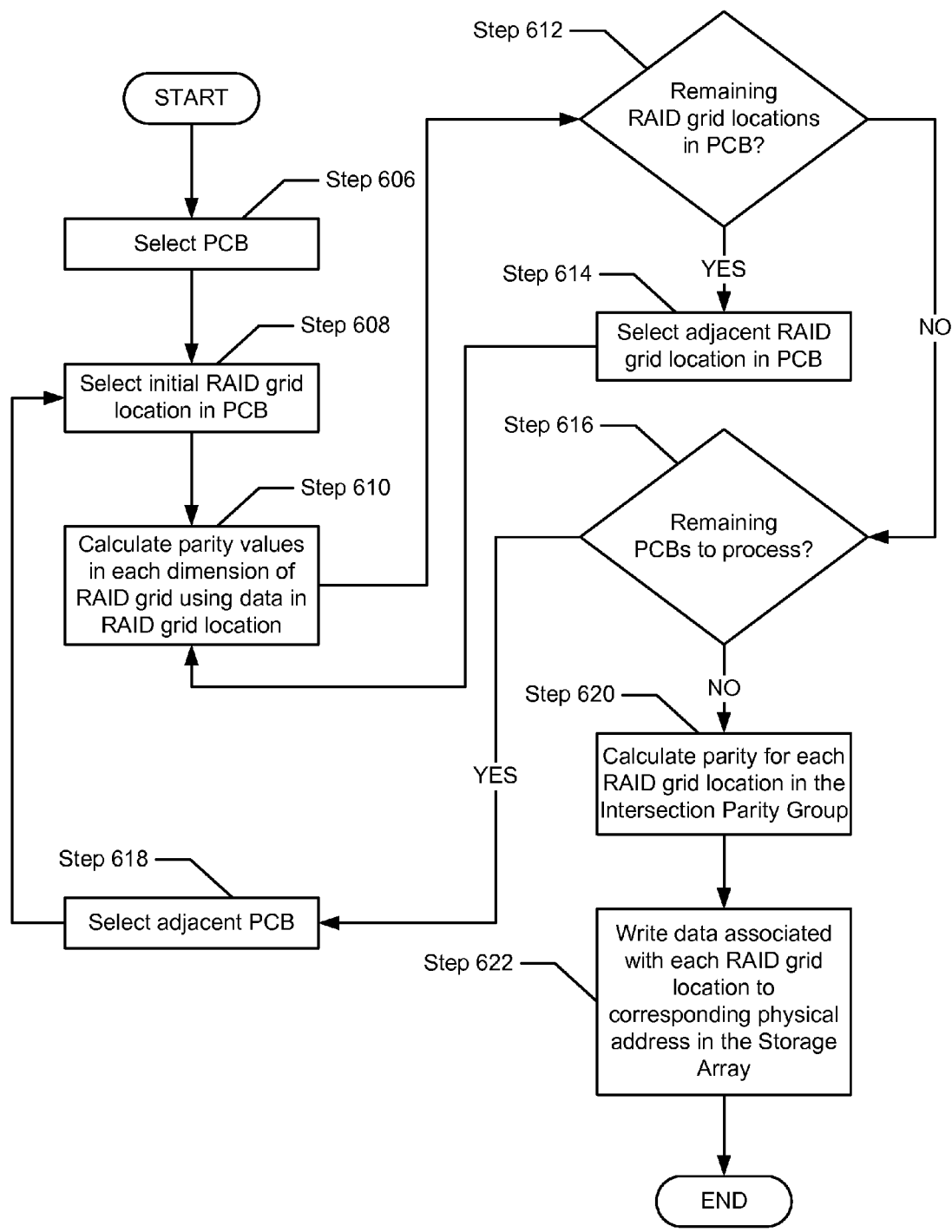

FIGS. 6A-6B show flowcharts in accordance with one or more embodiments of the invention. More specifically, FIGS. 6A-6B show a method for storing data in a storage array in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 6A and 6B may be performed in parallel.

Referring to FIG. 6A, in step 600, a request to write data is received from the client. In one embodiment of the invention, the request includes the <object, offset> that identifies the data from the perspective of the client. The write request is not limited to the write request described above; rather, the write request may include other information necessary to request the writing of data to the storage array. In step 602, the RAID controller, in response to the request, writes the data to a location in the RAID controller memory.

In step 604, the RAID controller updates one or more of the data structures (see e.g., FIG. 5). More specifically, in one embodiment of the invention, the RAID controller may (i) select a physical address in the storage array in which to write the data received from the client and (ii) create a mapping between the logical address for the data and the selected physical address. In one embodiment of the invention, at some point prior to selecting the physical address in which to write the data, the RAID controller specifies (i) at least one RAID Grid, (ii) RAID Grid locations for the RAID Grid, and (iii) the physical address in the storage array associated with each RAID Grid location identified in (ii). In addition, the RAID controller may initialize the state of each RAID Grid location to empty.

In one embodiment of the invention, FIG. 6B shows a method for writing a RAID Grid to the storage array in accordance with one or more embodiments of the invention. Referring to FIG. 6B, in step 606, a PCB is selected. In one embodiment of the invention, the PCB may be selected, at random, from the set of PCBs in the RAID Grid. Alternatively, the RAID controller may select a PCB based on a preset order of PCBs in the RAID Grid.

In Step 608, an initial RAID Grid location in the PCB is selected for processing. The initial RAID Grid location may be selected, at random, from the set of RAID Grid locations in the PCB. Alternatively, the RAID controller may select the RAID Grid location PCB based on a preset traversal order of RAID Grid locations in the PCB.

In Step 610, parity values (or intermediate parity values) are calculated using the data in the selected RAID Grid location. The number of parity calculations is based on the number of parity values that are present in each dimension of the RAID Grid. For example, if there are two parity values (P and Q) in each dimension, then four parity value calculations (two in each dimension) are performed using the data in the selected RAID Grid Location (see e.g., FIGS. 7A-7F). The results of the parity value calculations may be stored in cache as well as in the memory (106 in FIG. 1).

In Step 612, a determination is made about whether there are any remaining RAID Grid locations in the PCB to process. If there are remaining RAID Grid locations in the PCB to process, the process proceeds to Step 614; otherwise the process proceeds to Step 616. In one embodiment of the invention, all RAID grid locations in the PCB are processed prior to traversing to the next PCB.

In Step 614, an adjacent RAID Grid location is selected. The selection of the adjacent RAID Grid location may be based on a preset traversal order of the PCB or may be determined when the process proceeds to Step 614. Once the adjacent RAID Grid location is selected, the process proceeds to Step 610.

In Step 616, a determination is made about whether there are any remaining PCBs to process. If there are remaining PCBs to process, the process proceeds to Step 618; otherwise, the process proceeds to Step 620.

In Step 618, an adjacent PCB is selected. The selection of the adjacent PCB may be based on a preset traversal order of PCBs in the RAID Grid or may be determined when the process proceeds to Step 618. Once the adjacent PCB is selected, the process proceeds to Step 608.

In Step 620, at this stage all parity values (except the intersection parity values) (see FIG. 2) have been calculated and, as a result, the intersection parity values can be calculated using the other parity values in the RAID Grid. Accordingly, in step 620, the intersection parity values are calculated. Though not shown in FIG. 6B, if there are any RAID Grid locations in RAID Grid that are not part of any PCB, the parity calculations are performed on these RAID Grid locations prior to performing step 620. In Step 622, the RAID Grid (including all data and parity values) is written to the storage array.

FIG. 6B contemplates that data for all RAID Grid locations in the Data Grid (202) are received prior to initiating the calculation of the parity values. The invention is not limited to this embodiment of the invention. Rather, embodiments of the invention may be implemented in scenarios in which (i) all data for the Data Grid has not been received and (ii) intersection parity values are calculated incrementally. With respect to scenario (i), the Data Grid may be populated in the same traversal order as is used to perform parity value calculations (see e.g., FIG. 3B). In such cases, the parity value calculations are being performed after data is associated with a given RAID Grid location but prior to all RAID Grid locations in the Data Grid being associated with data. As a result, the RAID controller does not need to wait until all RAID Grid locations in the Data Grid are filled to perform parity value calculations. With respect to scenario (ii), the intersection parity values may be incrementally calculated by performing parity value calculations using parity values that are no longer intermediate parity values (see FIG. 7F). In such cases, the RAID controller does not need to wait until all parity values (excluding intersection parity values) are calculated, prior to calculating the intersection parity values.

FIG. 6B contemplates the RAID Grid being written to the storage array once all RAID Grid locations are associated with the appropriate data or parity value. The invention is not limited to this embodiment; rather, embodiments of the invention may be implemented such that the data or parity values are written to the storage array once they are obtained or calculated.

FIGS. 7A-7F show an example of calculating parity values in a RAID Grid in accordance with one or more embodiments of the invention. The example is not intended to limit the scope of the invention.

Figure 7A:
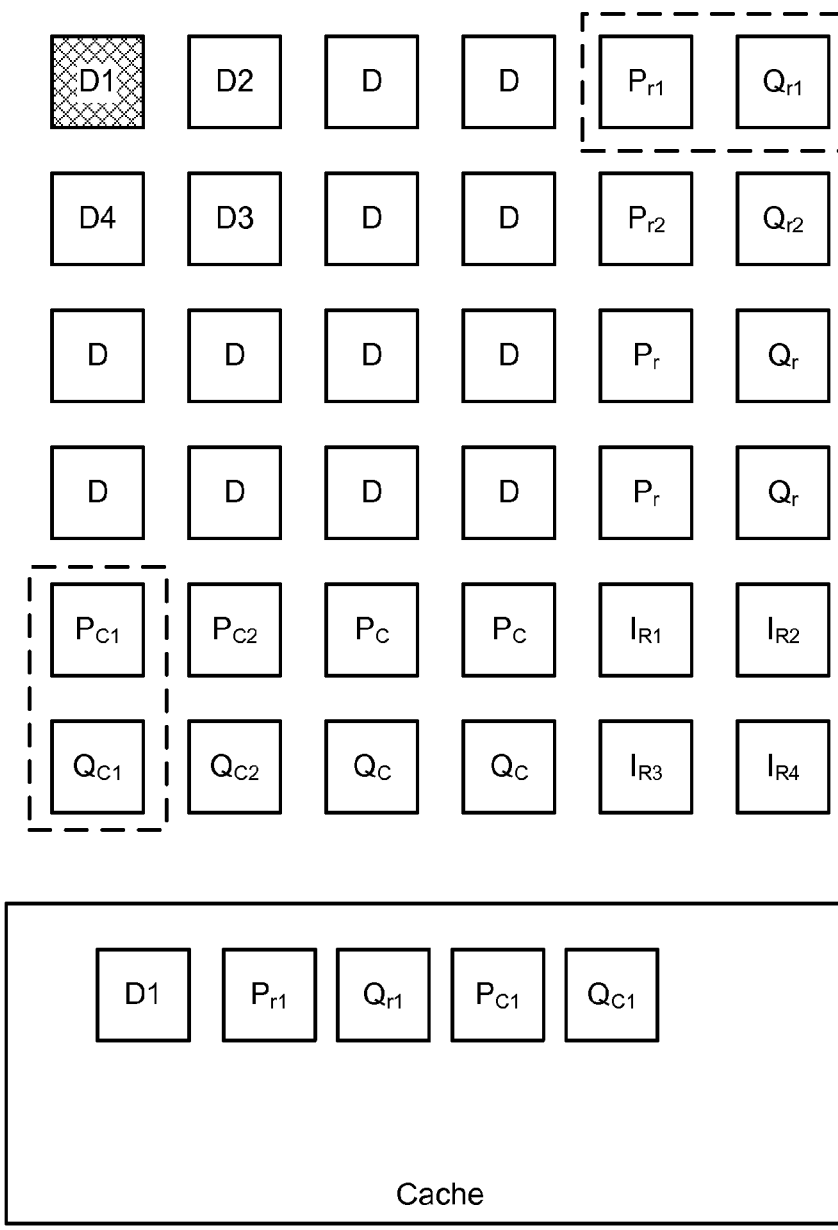
FIGS. 7A-7F show an example in accordance with one or more embodiments of the invention.

Turning to FIG. 7A, consider the scenario in which all RAID Grid Locations for the Data Grid (denoted with a "D" or D1-D4) are associated with data and that the cache can only store a maximum of nine values (i.e., any combination of data, intermediate parity values and/or parity values). Further, for the purposes of this example assume that D1-D4 are associated with a PCB. Using the method shown in FIG. 6B, the RAID controller (not shown) selects the RAID Grid location with data D1 and performs four parity calculations using D1 to obtain intermediate parity values for $P_{r1}$, $Q_{r1}$, $P_{c1}$, and $Q_{c1}$. The intermediate parity values and D1 are stored in the cache. The aforementioned calculation of intermediate parity values may result in one cache miss in order to store D1 in the cache. This assumes that there are no cache misses related to obtaining any of intermediate parity values in the cache.

Figure 7B:
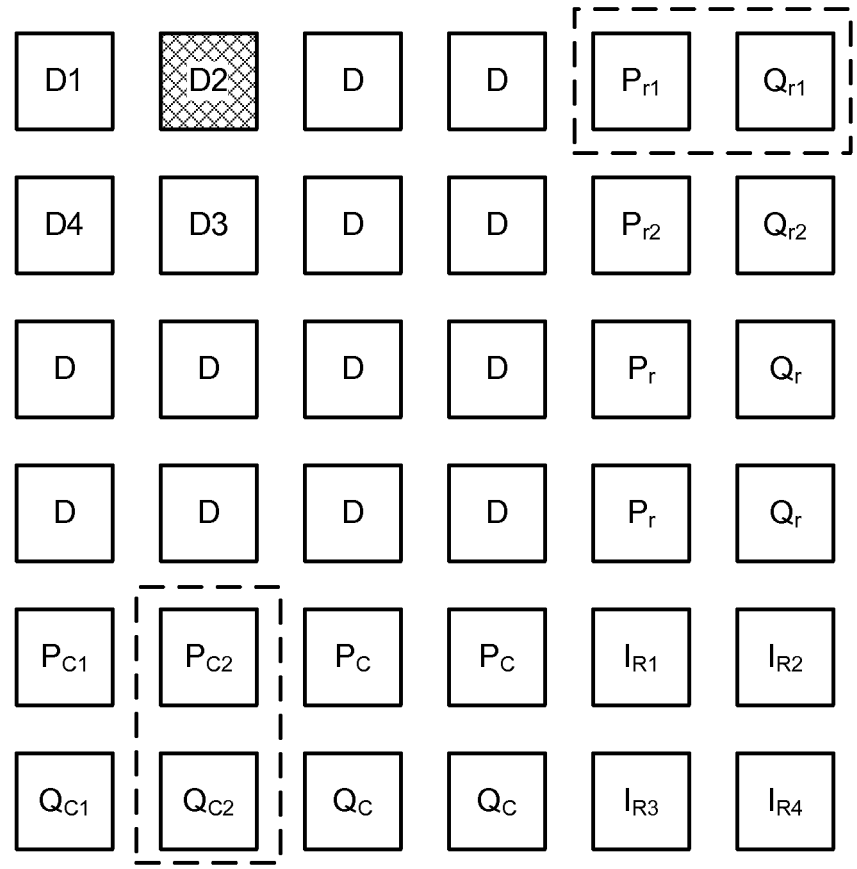
Figure 7B:
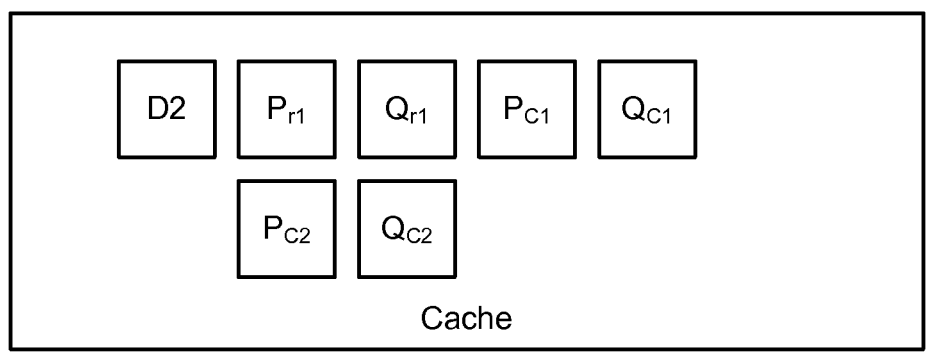

Referring FIG. 7B, the RAID controller selects an adjacent RAID Grid location in the PCB. In this example, the RAID controller selects the RAID Grid location with data D2 and performs parity calculations using D2 and intermediate parity values for $P_{r1}$ and $Q_{r1}$ to obtain updated intermediate parity values for $P_{r1}$, $Q_{r1}$, and performs parity calculations using D2 to obtain intermediate parity values for $P_{c1}$, and $Q_{c1}$. The updated intermediate parity values, the intermediate parity values, and D2 are stored in the cache. Thought not shown in FIG. 7B, D1 may also be in the cache at this time. The aforementioned calculation of intermediate parity values may result in one cache miss in order to store D2 in the cache. This assumes that there are no cache misses related to obtaining any of intermediate parity values in the cache.

Figure 7C:
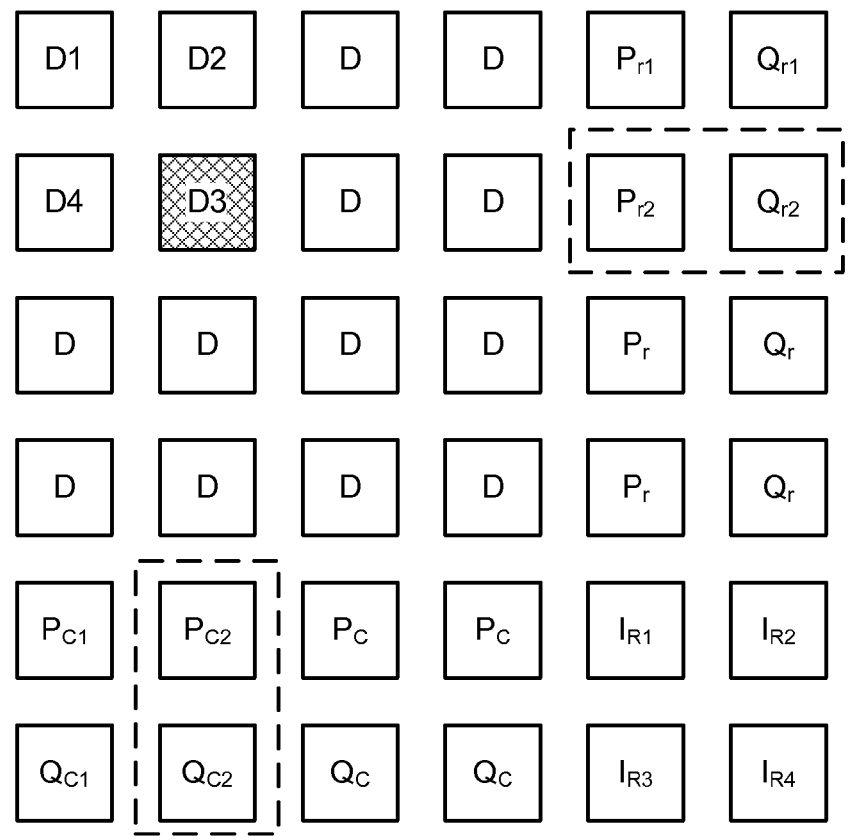
Figure 7C:
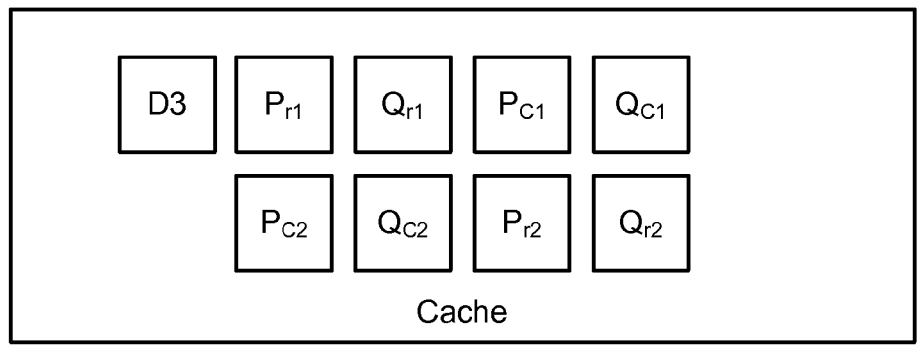

Referring FIG. 7C, the RAID controller selects an adjacent RAID Grid location in the PCB. In this example, the RAID controller selects the RAID Grid location with data D3 and performs parity calculations using D3 and intermediate parity values for $P_{c2}$ and $Q_{c2}$ to obtain updated intermediate parity values for $P_{c2}$, $Q_{c2}$, and performs parity calculations using D3 to obtain intermediate parity values for $P_{r2}$, and $Q_{r2}$. The updated intermediate parity values, the intermediate parity values, and D3 are stored in the cache. At this stage, D1 and D2 are not present in the cache. The aforementioned calculation of intermediate parity values (including updated parity values) may result in one cache miss in order to store D3 in the cache. This assumes that there are no cache misses related to obtaining any of the intermediate parity values in the cache.

Figure 7D:
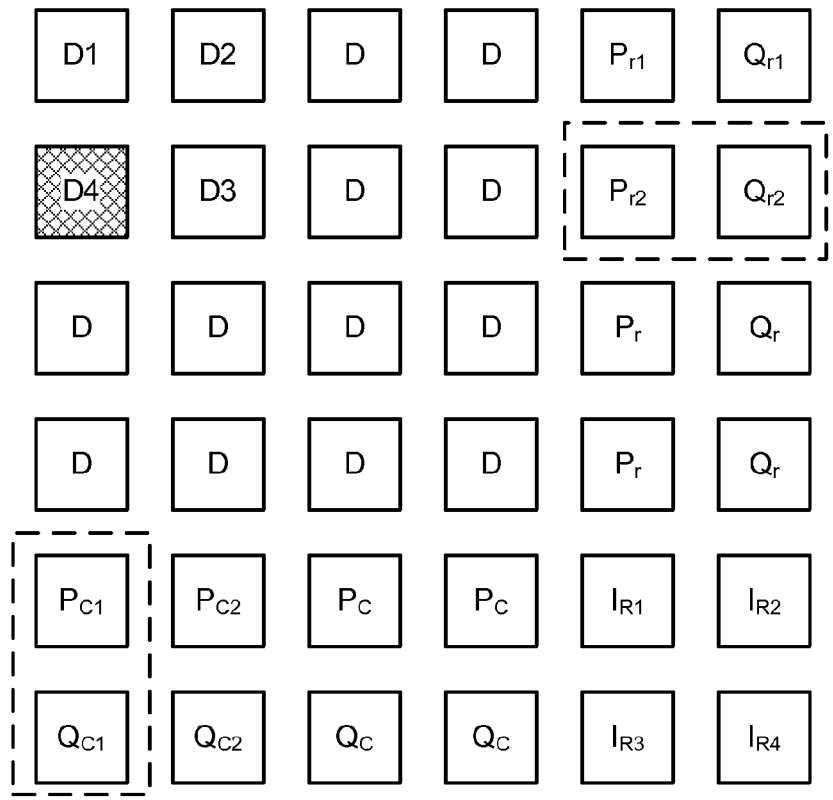
Figure 7D:
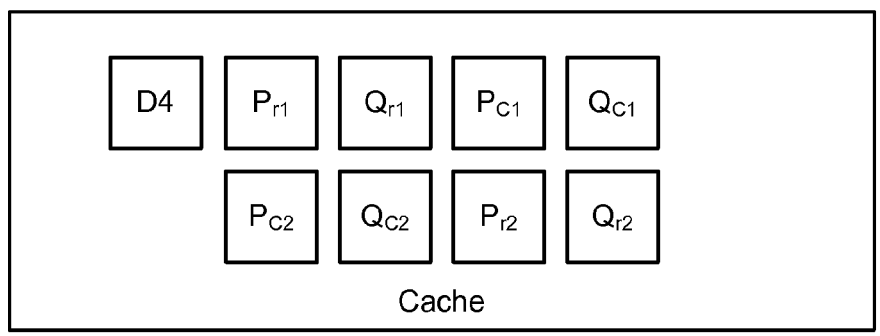

Referring FIG. 7D, the RAID controller selects an adjacent RAID Grid location in the PCB. In this example, the RAID controller selects the RAID Grid location with data D4 and performs parity calculations using D4 and intermediate parity values for $P_{c1}$, $Q_{c2}$, $P_{r2}$ and $Q_{r2}$ to obtain updated intermediate parity values for $P_{c1}$, $Q_{c2}$, $P_{r2}$ and $Q_{r2}$. The updated intermediate parity values and D4 are stored in the cache. At this stage, D1-D3 are not present in the cache. The aforementioned calculation of intermediate parity values may result in one cache miss in order to store D4 in the cache. This assumes that there are no cache misses related to obtaining any of intermediate parity values in the cache.

While the parity calculations described in FIGS. 7A-7C may result in cache misses to obtain any of the intermediate parity values, the traversal order of the PCB (i.e., D1→D2→D3→D4) results in no cache misses related to obtaining any intermediate parity values (or updated intermediate parity values) in order to perform the parity value calculations described in FIG. 7D.

Figure 7E:
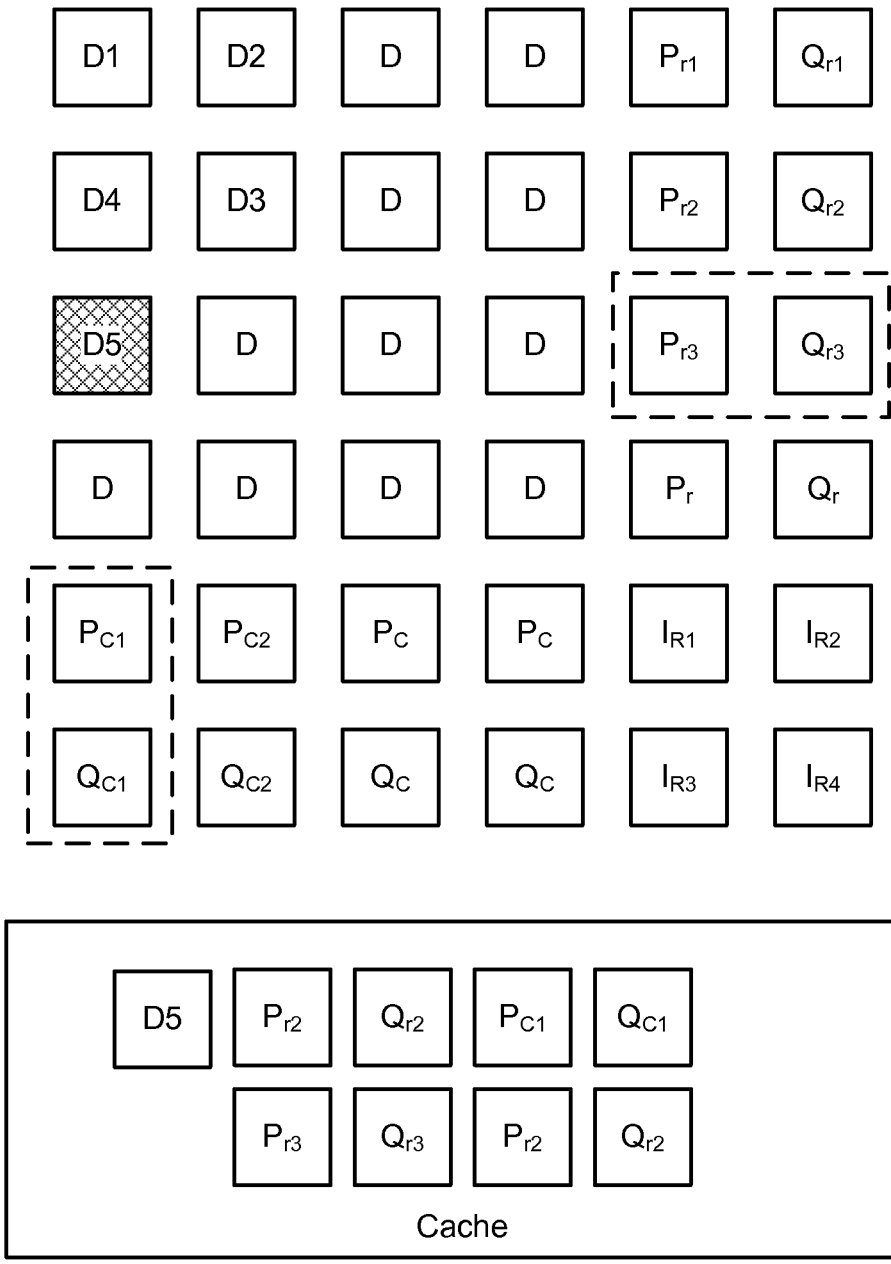

Referring to FIG. 7E, at this stage the PCB that includes D1-D4 has been processed and an adjacent PCB is selected. The adjacent PCB includes the RAID Grid location with D5. The RAID controller subsequently performs parity calculations using D5 and intermediate parity values for $P_{c1}$ and $Q_{c2}$, to obtain updated intermediate parity values for $P_{c1}$ and $Q_{c2}$ and performs parity calculations using D5 to obtain intermediate parity values for $P_{r3}$, and $Q_{r3}$. The updated intermediate parity values, the intermediate parity values, and D5 are stored in the cache. At this stage, D1-D4 are not present in the cache. The aforementioned calculation of intermediate parity values may result in one cache miss in order to store D5 in the cache.

Figure 7F:
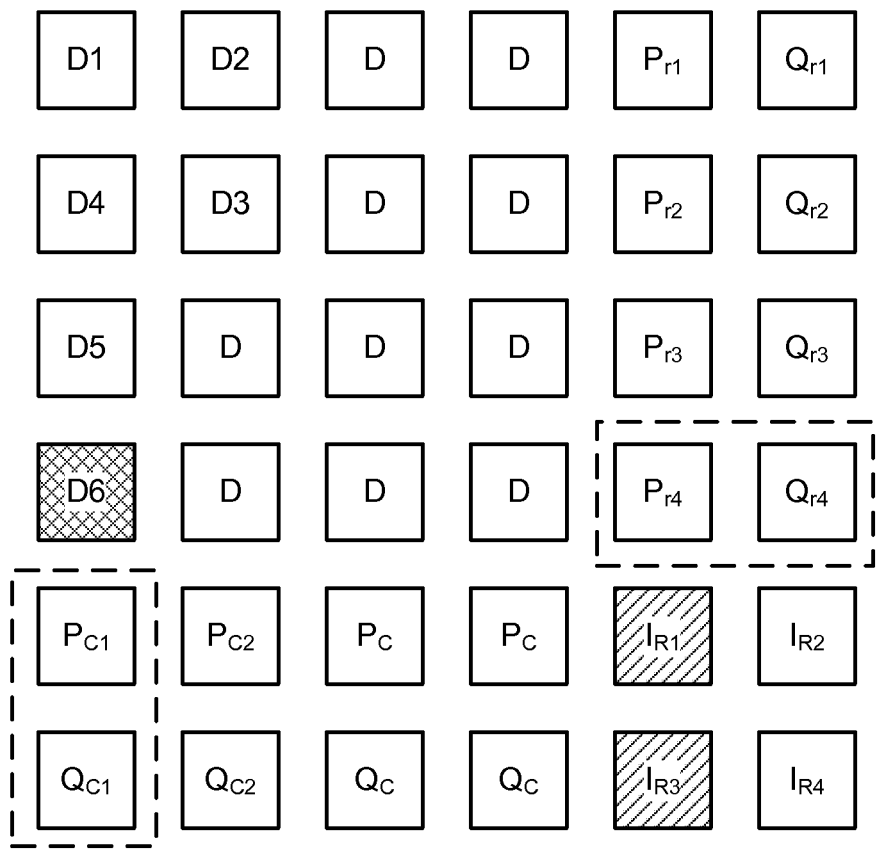
Figure 7F:
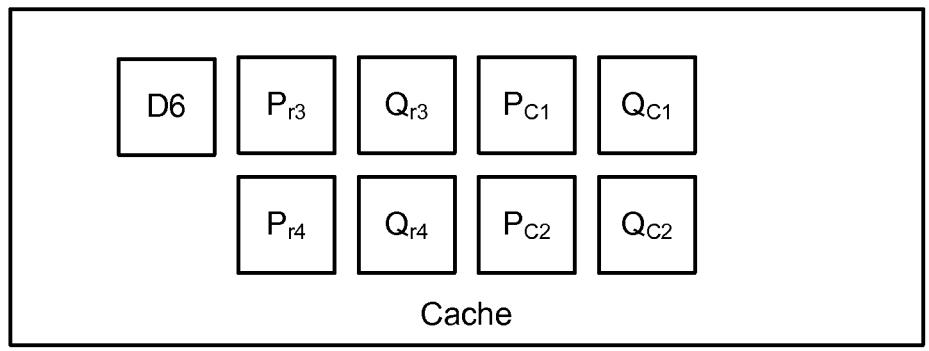

Referring FIG. 7F, the RAID controller selects an adjacent RAID Grid location in the PCB. In this example, the RAID controller selects the RAID Grid location with data D6 and performs parity calculations using D6 and updated intermediate parity values for $P_{c1}$ and $Q_{c1}$ to obtain final parity values for $P_{c1}$, and $Q_{c1}$, and performs parity calculations using D6 to obtain intermediate parity values for $P_{r3}$, and $Q_{r3}$. The updated intermediate parity values, the intermediate parity values, and D6 are stored in the cache. At this stage, D1-D5 are not present in the cache. The aforementioned calculation of intermediate parity values may result in one cache miss in order to store D6 in the cache. The parity values for $P_{c1}$ and $Q_{c1}$ are final parity values as there are no other data values that will contribute to the parity values of $P_{c1}$ and $Q_{c1}$. As discussed above, the intersection parity values may be incrementally calculated using final parity values even though not all parity values (excluding intersection parity values) for the RAID Grid have been calculated. In this example, because $P_{c1}$ and $Q_{c1}$ are final parity values, intermediate values for $I_{r1}$ and $I_{r3}$ may be calculated.

Those skilled in the art will appreciate that while various examples of the invention has been described with respect to storing data in a storage array along IFDs and/or storing data in NAND flash, embodiments of the invention may be implemented on any multi-dimensional disk array without departing from the invention. For example, one or more embodiments of the invention may be implemented using a two dimensional array of disks (magnetic, optical, solid state, or any other type of storage device), where data for each RAID Grid location in a RAID Grid is stored on a separate disk.

Further, in one embodiment of the invention, in the event that the RAID controller is implementing a 3D RAID scheme using a two dimensional array of disks, the RAID controller may store data for each of the RAID Grid locations using the following n-tuple: <disk x, disk y, logical block address (LBA) z>, where x and y are the dimensions of the disk array. Further, for a given RAID Grid the LBA is constant for each RAID Grid location for a single RAID Grid; however, the LBA is different across the RAID Grids in the RAID cube.

The above examples for implementing embodiments of the invention using a two-dimensional disk array are not intended to limit the scope of the invention.

Those skilled in the art will appreciate that while the invention has been described with respect to a 2D RAID scheme and a 3D RAID scheme, embodiments of the invention may be extended to any multi-dimensional RAID scheme.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
  a memory, a cache, and a persistent storage; and
  a processor that:
    performs, using a first datum, a first plurality of parity value calculations to obtain a first plurality of parity values, wherein the first datum is associated with a first Redundant Array of Independent Disks (RAID) Grid location in a first parity calculation block (PCB) in a RAID Grid, wherein the RAID Grid comprises a first dimension and a second dimension, wherein at least one of the first plurality of parity values is associated with the first parity RAID Grid location in the first dimension and at least one of the first plurality of parity values is associated with a second parity RAID Grid location in the second dimension;
    performs, using a second datum, a second plurality of parity value calculations to obtain a second plurality of parity values, wherein the second datum is associated with a second RAID Grid location in the first PCB;
    performs, using a third datum and at least one selected from a group consisting of at least one of the first plurality of parity values and at least one of the second plurality of parity values, a third plurality of parity value calculations to obtain a third plurality of parity values, wherein the third datum is associated with a third RAID Grid location in the first PCB;

performs, using a fourth datum and at least one selected from a group consisting of at least one of the first plurality of parity values and at least one of the second plurality of parity values, a fourth plurality of parity value calculations to obtain a fourth plurality of parity values, wherein the fourth datum is associated with a fourth RAID Grid location in the first PCB; and stores each of the fourth plurality of parity values in at least one selected from a group consisting of the cache, the memory, and the persistent storage, wherein each of the fourth plurality of parity values is associated with a separate RAID Grid location in the RAID Grid, wherein the processor is operatively connected to the memory, the cache, and the persistent storage.

2. The system of claim 1, wherein the processor further: after performing parity value calculations using data in all of the RAID Grid locations in the first PCB:

performs, using a fifth datum and at least one selected from a group consisting of at least one of the third plurality of parity values and at least one of the fourth plurality of parity values, a fifth plurality of parity value calculations to obtain a fifth plurality of parity values, wherein the fifth datum is associated with a fifth RAID Grid location in a second PCB in the RAID Grid.

3. The system of claim 1, wherein the processor further: after performing parity value calculations using data in all of the RAID Grid locations in the first PCB:

performs, using a fifth datum, a fifth plurality of parity value calculations to obtain a fifth plurality of parity values, wherein the fifth datum is associated with a fifth RAID Grid location in the second PCB in the RAID Grid, and wherein the second PCB is adjacent to the first PCB.

4. The system of claim 1, wherein the persistent storage comprises solid state memory.

5. The system of claim 1, wherein the first plurality of parity values comprises at least one selected from a group consisting of a P parity value and a Q parity value.

6. The system of claim 1, wherein the first PCB comprises N RAID Grid locations in the first dimension and N RAID Grid locations in the second dimension, wherein N≥2.

7. The system of claim 1, wherein the first PCB comprises N RAID Grid locations in the first dimension and M RAID Grid locations in the second dimension, wherein N≥2, M≥2, and N≠M.

8. The system of claim 1, wherein the RAID Grid comprises a plurality of PCBs, wherein the first PCB is one of the plurality of PCBs.

9. The system of claim 1, wherein the RAID Grid comprises N PCBs in the first dimension and N PCBs the second dimension, wherein N≥2.

10. The system of claim 1, wherein the RAID Grid comprises N PCBs in the first dimension and M PCBs the second dimension, wherein N≥2, M≥2, and N≠M.

11. A system, comprising:
a memory, a cache, and a persistent storage; and
a processor that:
calculates a first set of parity values for a RAID Grid using datum stored in each of a plurality of RAID Grid locations in a first parity calculation block (PCB), wherein the datum associated with each of the plurality of RAID Grid locations in the first PCB is obtained in a first order and wherein the first order is based on a Hilbert curve wherein, based on the first order, a first parity value is calculated using a first datum in a first RAID Grid location in the first PCB, and a second parity value is calculated using a second datum in a last RAID Grid location in the first PCB, wherein the last RAID Grid location is adjacent to the first RAID Grid location, wherein the first PCB comprises N RAID Grid locations, wherein N≥4;

calculates a second set of parity values for the RAID Grid using datum stored in each of a plurality of RAID Grid locations in a second PCB, wherein the datum associated with each of the plurality of RAID Grid locations in the second PCB is obtained in a second order and wherein the second order is based on the Hilbert curve; and stores at least a portion of the first set of parity values and at least a portion of the second set of parity values in at least one selected from a group consisting of the cache, the memory, and the persistent storage, wherein each of the first set of parity values and the second set of parity values is associated with a separate RAID Grid location in the RAID Grid, wherein the processor is operatively connected to the memory, the cache, and the persistent storage.

12. The system of claim 11, wherein the RAID Grid comprises a plurality of PCBs, wherein the first PCB is one of the plurality of PCBs and the second PCB is one of the plurality of PCBs.

13. The system of claim 12, wherein the plurality of PCBs are traversed in a third order, wherein the third order is based on the Hilbert curve.

14. The system of claim 12, wherein the plurality of PCBs are traversed in a third order, wherein the third order has the same pattern as the first order.

15. The system of claim 11, wherein the first RAID Grid location is adjacent to the last RAID Grid location when the last RAID Grid location is in one selected from a group consisting of: in the same row as the first RAID Grid location and in the same column as the first RAID Grid location.

16. The system of claim 11, wherein a size of the cache is less than a size of the RAID Grid.

17. A system, comprising:
a memory, a cache, and a persistent storage; and
a processor that:
calculates a first set of parity values for a RAID Grid using datum stored in each of a plurality of RAID Grid locations in a first parity calculation block (PCB), wherein the datum associated with each of the plurality of RAID Grid locations in the first PCB is obtained in a first order, wherein the first order is based on a Hilbert curve, wherein the first PCB comprises N RAID Grid locations in a first dimension and N RAID Grid locations in a second dimension, wherein N≥2, wherein the cache is configured to store one selected from a group consisting of only 2N+1 values and only 4N+1 values, wherein each of the values is one selected from a group consisting of datum and a parity value;

calculates a second set of parity values for the RAID Grid using datum stored in each of a plurality of RAID Grid locations in a second PCB, wherein the datum associated with each of the plurality of RAID Grid locations in the second PCB is obtained in a second order and wherein the second order is based on the Hilbert curve; and stores at least a portion of the first set of parity values and at least a portion of the second set of parity values in at least one selected from a group consisting of the cache, the memory, and the persistent storage, wherein each of the first set of parity values and the second set of parity values is associated with a separate RAID Grid location in the RAID Grid.

18. The system of claim 17, further comprising:
a field programmable gate array (FPGA), operatively connected to the processor, that;
calculates at least one of the first set of parity values.

19. The system of claim 17, wherein the persistent storage comprises flash memory.

20. The system of claim 17, wherein the processor is located within a RAID controller.

* * * * *